United States Patent

[11] 3,633,472

[72] Inventors Andrew Robert Meyncke
7150 C Melrose, Buena Park, Calif. 90620;
Eugene Arday, 10350 North Lynn Circle,
Mira Loma, Calif. 91752
[21] Appl. No. 22,895
[22] Filed Mar. 26, 1970
[45] Patented Jan. 11, 1972

[54] IDENTIFICATION CAMERA ADAPTER
10 Claims, 5 Drawing Figs.
[52] U.S. Cl. ................................. 95/1.1, 95/36 R
[51] Int. Cl. ............................. G03b 17/24
[50] Field of Search ........................... 95/1.1, 36

[56] References Cited
UNITED STATES PATENTS
1,715,593 6/1929 Coan ..................... 95/36
2,404,366 7/1946 Duffy ..................... 95/36
2,896,522 7/1959 Stein ..................... 95/1.1

Primary Examiner—Samuel S. Matthews
Assistant Examiner—E. M. Bero
Attorney—Gregg William Hornaday ABSTRACT: This invention discloses an identification camera adapter which produces photographs including the image of a subject in combination with pertinent related information of considerable length on the same exposure. The device masks one portion of the negative while the other portion is being exposed; the adapter is then placed in another position causing the exposed portion to be masked while the unexposed portion is then exposed.

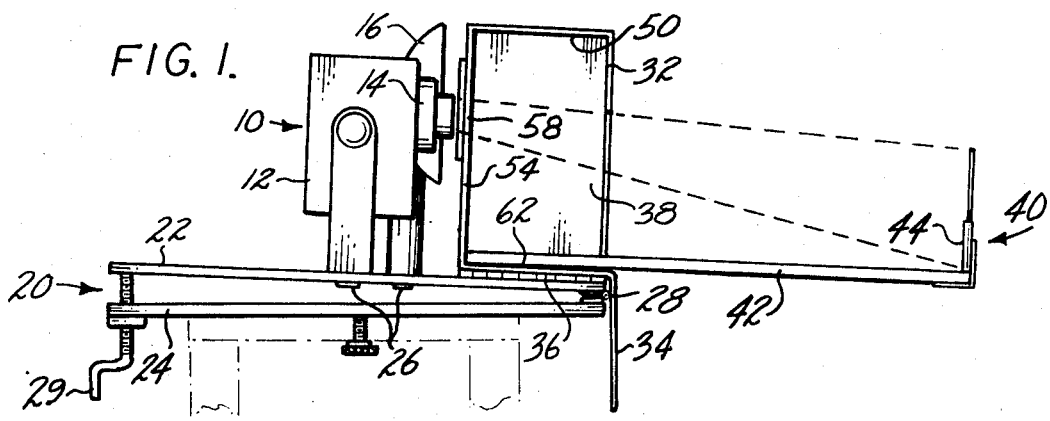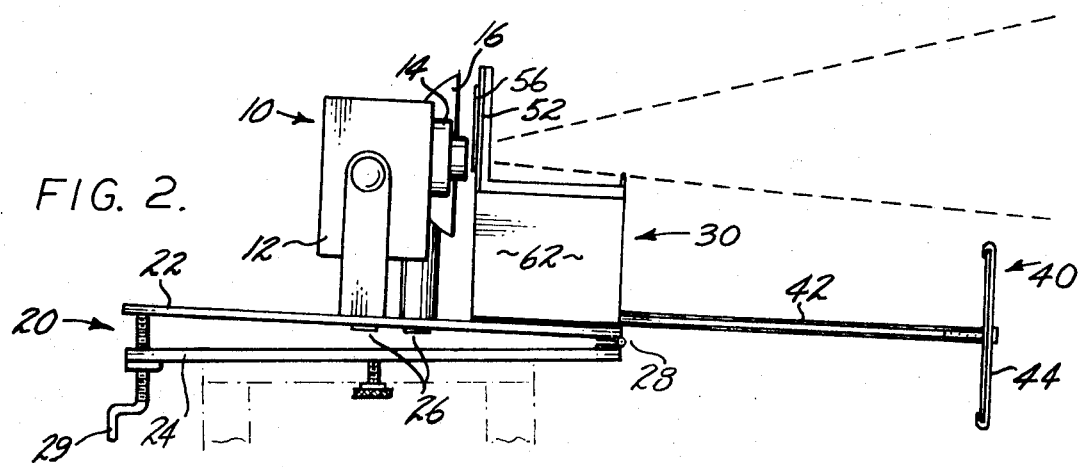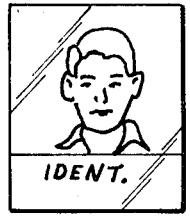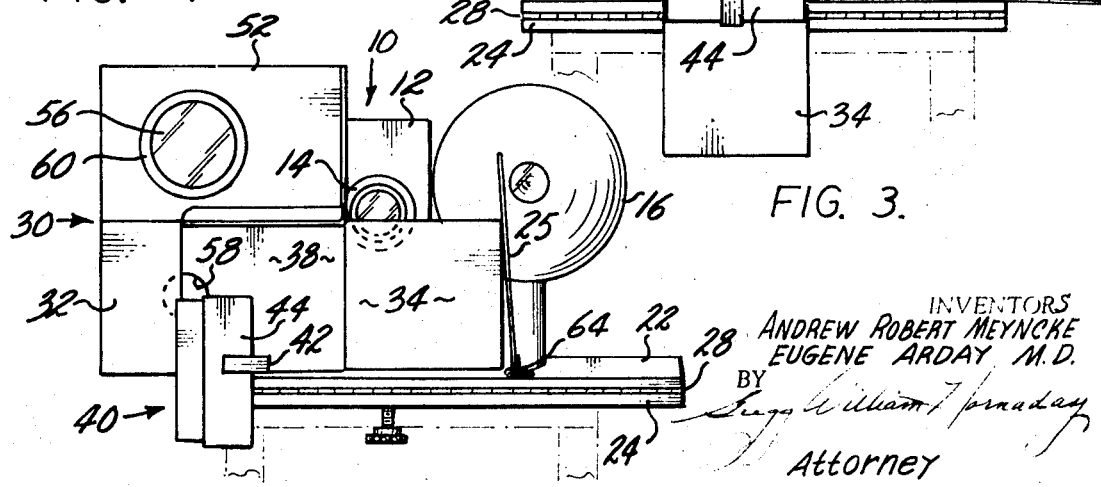

1

IDENTIFICATION CAMERA ADAPTER

SUMMARY

Cameras of many types and models have been used for years in personal, business, governmental, and industrial environments for the purpose of recording the image of a subject and accompanying written or illustrative information on the same negative. Subjects photographed are usually persons, but are occasionally articles, views, or other inanimate objects. The information accompanying the subject is typically name, age, serial number, or other identifying number, and various statistics such as weight, height, color or of skin, hair, and eyes, and history, background, or record of performance. Examples of such photographs include the booking photographs taken in jails and prisons, and entrance photographs taken in mental hospitals where the purpose is to irrevocably record the image of the individual with his name and other identification. The purpose of such photographs include convenience, and the avoidance of substitution of the photograph with the identification data of another individual.

Present methods of producing a photograph of the type described above are generally of two kinds. The most common method finds the subject holding a breast plate or sign a few inches below his chin. The photographer or the subject himself has patiently inserted letters forming words and identification numbers on the breast plate. The subject is then photographed holding the breast plate. This method has several unsatisfactory aspects. The amount of information which may be placed on the breast plate is limited. Letters must be at least one-half inch tall to be clearly readable. Usually no more than a name and a number may be recorded with the photograph by this method. There is also a natural reluctance and uneasiness of the subjects to be photographed with this information across his chest. This method is so identifiable with prisons and similar institutions that its elimination will cause the subject to be more relaxed and willing to be photographed. This is especially true in the typical business or industrial situation.

Another method involves rephotographing two separate exposure to produce a third, complete picture. By this method the subject is photographed, and the written information is separately photographed. The two prints are then placed adjacent to each other and rephotographed. The disadvantages are obvious, in that three separate exposures must be made.

The object of this invention is to provide an adapter for an identification photograph camera which will avoid all of the disadvantages in the present methods discussed above. A further object is to provide an adapter which is simple, easy to use, and relatively compact.

A still further object of the invention is to provide a camera adapter which will mask the upper or lower portion of the negative while the other portion is being exposed, and which may be repositioned to reverse the masked/exposed positions for exposure of the originally masked portion.

Other objects and advantages of the present invention become apparent to those skilled in the art upon consideration of the following detailed description of the preferred embodiment thereof, reference being had to the accompanying drawings, wherein:

FIG. 1 is a side elevational view showing the device in the "data" position, with the mask in position to photograph the identification card on the lower portion of the negative.

FIG. 2 is a side elevational view of the device in the "subject" position showing the device with the mask in position to photograph the subject on the upper portion of the negative.

FIG. 3 is a front elevational view showing the device in the same position as FIG. 1.

FIG. 4 is a front elevational view showing the device in the same position as in FIG. 2.

FIG. 5 is a plan view of the resulting identification photo.

Referring to the drawings, a camera 10 will be seen in conjunction with an identification photograph adapter 30 and a data carrier 40. Each is mounted to an adjustable base 20.

The camera 10 is typical of many cameras which could be used with the adapter. Any camera capable of photographing a subject a few feet away from the lens could be used. Black and white, color, standard, or Polaroid photographic materials are acceptable.

For convenience, a camera 10 is shown having a basic body 12, lens and filter combination 14, and accompanying synchronized flash attachment 16. The camera and flash are mounted to the upper base 22 by means of standard tripod screws 26.

The upper base 22 is connected to the lower base 24 by a hinge 28. A crank 29 is used to elevate and lower the upper base 22 in relation to the lower base 24. The purpose of the crank is for flexibility in sighting the camera on the subject. The subject usually stands or sits, and depending upon his height, the camera 10, adapter 30, and upper base 22 must be adjusted accordingly.

The adapter 30 is mounted to the upper base 22 by or "a hinge 36, which is attached to the baseplate. 62 of the adapter. The main portion of the adapter In the in the configuration of an incomplete box having additional walls extending therefrom. In the "data" position, a sidewall 38 extends vertically upward from one side of the baseplate 62 in a plane which is normal to the plane of The baseplate, and is disposed between and parallel to the focal axis of the lens 14 and the illumination axis of the flash 16, which will shield the masking wall 32 from direct light from the flash. A backwall 54 extends normally from the baseplate upward along the rear edge of and normal to the top of the sidewall 38. The backwall is extended at the same height and in the same plane, on the opposite side of the sidewall 38. This portion of the backwall 54 is referred to as the backwall extension 52. The backwall 54 has an opening into which an accessory lens 58 is inserted. The accessory lens 58 aligns with the camera lens 14 when the adapter is in the "data" position.

The backwall extension 52 carries an opening 60. The purpose of the backwall extension 52 is to reduce the intensity of the light emanating from the flash 16 when the device 30 is in the "data" position. The opening 60 carries a light reducing screen 56. The screen may be of stained glass, fine meshed metal screen, perforated metal plate or any other known material which will reduce the intensity of light passing through. The size of the opening, and type of material used as a screen will depend upon the type and size of flash being used, and the size, color, reflective quality, and type of identification information being photographed. Since the identification information is photographed at a location much closer to the camera than the subject, it is necessary to reduce the intensity of the light to avoid over illumination of the card carrying the information. This must be carefully determined to assure the highest quality print.

A masking wall 32 is located in a plane parallel to and in a spaced relation from the backwall 54. The masking wall is defined at the top by the upper plate 50 and at one side by the sidewall 38. The masking wall extends down from the upper plate for a distance calculated to mask the upper portion of a negative in the exposure position of the camera. The length of the masking wall will depend upon the amount of the negative desired to be masked. The upper plate 50 is defined on three sides by the backwall 54, sidewall 38, and masking wall 32. It is normal to these walls, provides structural support, and is the top of the boxlike configuration. A masking plate 34 is attached normal to the base plate 62, extends downward, and is in the same plane as the masking wall 32. When the adapter 30 is in the "data" position, the masking plate 34 extends downward and serves no function. When the adapter is in the "subject" position, the masking plate serves to mask the lower portion of the negative. The width of the masking plate 34 will be determined, as in the length of the masking wall, by the amount of the negative sought to be masked.

A light shield 25 is mounted to the upper base 22 by means of a hinge 64, the axis of that hinge being parallel to the axis by means of a hinge 64, the axis of that hinge being parallel to the axis of hinge 36. When the adapter is in the "data" position, the light shield is swung away from the adapter and lays on the upper base. When the adapter is in the "subject" position, the light shield is swung up vertically leaning against the masking plate 34. Its purpose in this position is to shield light from the flash 16. This avoids illuminating the masking plate 34.

A card carrier 40 comprises an arm 42 and card plate 44. The arm 42 is adjustably attached to the upper plate 22 and extends parallel to the focal axis of the camera and carries the card plate 44, which is mounted vertically at the end of the arm. The card plate holds a card or sheet of paper by clips, slots, or similar convenient method.

The adapter 30 is set in either the "data" position or "subject" position and an exposure is made. A second exposure is made after changing the position of the adapter. In the "subject" position the light shield 25 is placed in the vertical position.

We claim:

1. A device for masking a portion of a negative in an identification camera, which comprises:
    a. a base;
    b. a baseplate mounted to said base;
    c1 means for mounting said base plate to said base to allow movement of said baseplate from a horizontal position parallel to said base to a position vertical to said base;
    d. a first masking wall mounted to and in a plane normal with said baseplate and interposed between the negative of an identification camera and the subject;
    e. a second masking wall mounted to said baseplate in the same plane as and in a spaced relation from said first masking wall in such a manner that said second masking wall will in the vertical baseplate position occupy a position in space adjacent to the position occupied by said first masking wall in said horizontal baseplate position, and further interposed between the negative of an identification camera and the subject.

2. A masking device as recited in claim 1, including the following additional element:
    a. light intensity reducing means connected to said base in a manner to align with a flash bulb when said baseplate is in the horizontal position.

3. A masking device as recited in claim 2, in which the light intensity reducing means comprises:
    a. a first wall attached normal to said baseplate;
    b. said first wall defining an aperture;
    c. a light intensity reducing material mounted over said aperture.

4. A masking device as recited in claim 3, in which the light intensity reducing material comprises:
    a. a screen.

5. A masking device as recited in claim 1 including the following additional element:
    a. an arm extending adjustably from said base;
    b. a card plate attached to the end of said arm.

6. A masking device as recited in claim 3 including the following additional element:
    a. said first wall defining a second aperture for alignment with a camera lens;
    b. a second wall extending from and normal to said baseplate, and normal to said baseplate, and normal to and disposed between the planes of said first wall and said masking walls, and further disposed between said apertures.

7. A masking device as recited in claim 6 including the following additional element:
    a. a light shield mounted to said base to shield said second masking wall when said baseplate is in the vertical position;
    b. hinge means to mount said light shield to said base.

8. A masking device as recited in claim 6 including the following additional elements:
    a. an arm extending adjustable from said base;
    b. a card plate attached to the end of said arm.

9. A masking device as recited in claim 7 including the following additional elements:
    a. an arm extending adjustably from said base;
    b. a card plate attached to the end of said arm.

10. A masking device as recited in claim 9 including the following additional elements:
    a. a lower base disposed below and substantially parallel with the plane of said base;
    b. hinge means for connecting said lower base to said base;
    c. crank means attached to said lower base and making contact with said base in a manner to raise or lower said base with respect to said lower base.

* * * * *